(No Model.)

E. KIMMEL & E. E. CLAUSSEN.
INSTRUMENT FOR MEASURING THE MEAN HEIGHT OF STEAM ENGINE INDICATOR DIAGRAMS.

No. 336,812. Patented Feb. 23, 1886.

Attest:
Philip F. Larner
Howell T. Bartte

Inventors:
Ernest Kimmel
Edward E. Claussen
By Wm. C. Wood
Attorney.

N. PETERS, Photo-Lithographer, Washington, D. C.

UNITED STATES PATENT OFFICE.

ERNEST KIMMEL AND EDWARD E. CLAUSSEN, OF PROVIDENCE, R. I.

INSTRUMENT FOR MEASURING THE MEAN HEIGHT OF STEAM-ENGINE-INDICATOR DIAGRAMS.

SPECIFICATION forming part of Letters Patent No. 336,812, dated February 23, 1886.

Application filed August 8, 1884. Serial No. 140,028. (No model.)

*To all whom it may concern:*

Be it known that we, ERNEST KIMMEL and EDWARD E. CLAUSSEN, both of the city and county of Providence, in the State of Rhode Island, have invented a certain new and useful Improvement in Apparatus for Measuring the Mean Height of Steam-Engine-Indicator Diagrams; and we do hereby declare that the following specification, taken in connection with the drawings furnished and forming a part of the same, is a clear, true, and complete description of our invention.

An apparatus embodying said improvement in many respects resembles what are known as "polar planimeters," but instead of being designed for the measurement of irregular areas, it is so graduated and provided with means for its accurate adjustment to the length of diagrams of which the mean height is desired that after following the outlines of such a diagram its height can be at once read off in inches and fractions of an inch. Like one well-known form of polar planimeter, this instrument has a measuring-wheel, a vernier, a fulcrum bar or arm, and a tracer bar or arm, but, unlike any of which we have knowledge, it has a measuring-wheel graduated for indicating the measurement of the distance traveled by it, and gage-points by which the distance between the periphery of the wheel and the tracer-point can be exactly adjusted with relation to the vertical boundaries or end lines of a diagram, and the measuring-wheel and vernier are so graduated that it will directly indicate the height of such diagram in length-units after the usual tracing movements, if the adjustment referred to has been first accurately made.

To more particularly describe said improvements, reference is made to the accompanying drawings, in which—

Figure 1:
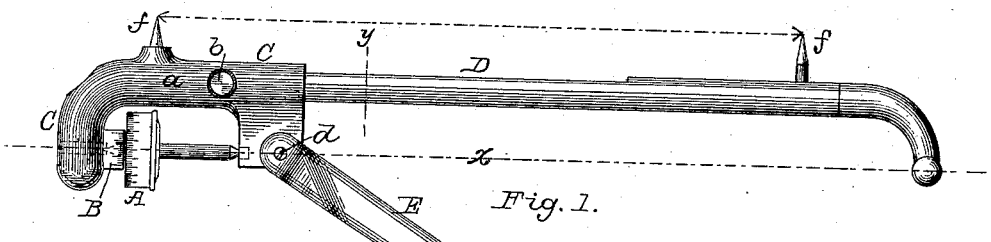
Figure 2:
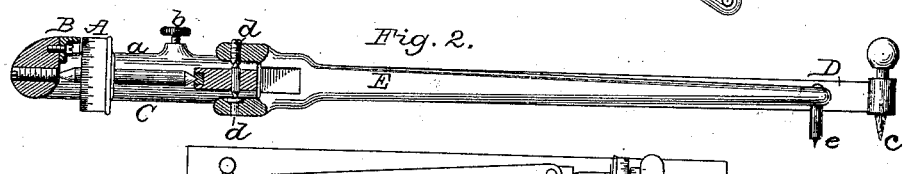
Figure 4:
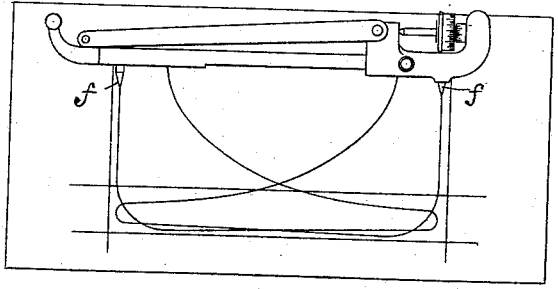
Figure 5:
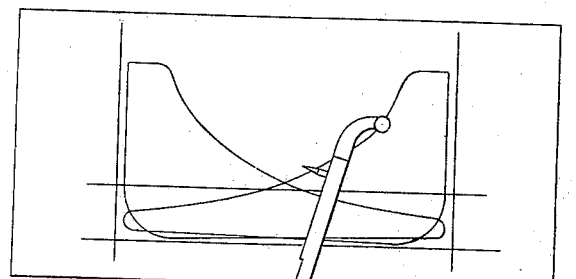
Figure 3:
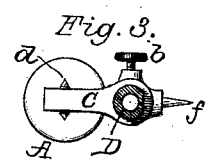

Figure 1 is a top or plan view of a full-sized instrument embodying said improvement. Fig. 2 is a view of the same, partially in side view and partially in vertical section, on line *x*, Fig. 1. Fig. 3 is a vertical section of same on line *y*, Fig. 1. Fig. 4 is a plan view of a steam-indicator diagram with the instrument as placed thereon for adjustment. Fig. 5 is a similar view, but with the instrument in position as if proceeding for measurement of the mean height of the diagram.

The graduated measuring-wheel A is mounted on a shaft having center bearings at each end, and alongside of said wheel opposite its graduated edge there is a vernier, B, both being mounted in a solid frame, C, in a manner well known. It is to be understood that our measuring-wheel differs from the corresponding wheel of a planimeter in that it is graduated to indicate its peripheral measurement in linear inches and fractions of an inch, whereas the planimeter-wheel is graduated to indicate squares or areas. In the instrument as preferably constructed by us the periphery of said wheel measures exactly two inches, but its graduations, although on its hub which is of lesser diameter, indicate a division of the peripheral line of the wheel into inches and fractions of an inch. The periphery of the wheel is divided into one hundred parts, and hence each graduation represents one-fiftieth ($\frac{1}{50}$) of an inch, but at every fifth graduation a number indicating hundredths is employed—thus, 0 10 20 30, and so on up to 190. The vernier is so made and graduated as to enable its reading to be one-twentieth ($\frac{1}{20}$) of any single graduation of the wheel, and hence the measurements can be read in one-thousandths ($\frac{1}{1000}$) of an inch. Said frame C, parallel with the axis of the measuring-wheel, has a sleeve or housing, *a*, provided with a lateral set-screw, *b*, and within this sleeve the tracer-bar D is fitted so as to slide freely, but be capable of a fixed adjustment therein by means of said set-screw.

In planimeters it is well known that the tracer-arm has been made longitudinally adjustable and provided with graduations for enabling the instrument to be adjusted according to the particular scale employed in making each field-plot to be measured; but our tracer-arm is made longitudinally adjustable to enable the tracer-point and the periphery of the measuring-wheel to occupy their proper relative positions according to the length of any steam-engine diagram preparatory to measuring its mean height with our instrument. At the outer end of the tracer-bar there is the usual scribing or tracing point, *c*. The frame C is pivoted to the fulcrum-bar E at *d*, and this bar at its outer end has a puncturing pivot-point, *e*.

As an entirely novel feature the instrument is provided with gage-points *f*, one being on the frame C, and the other in the same plane therewith on the tracer-bar. These points are respectively so located on the frame and bar with reference to the measuring-wheel, the fulcrum $d$, and tracing-point $c$, that when said points $f$ are set to exactly correspond with the vertical lines of a diagram, as illustrated in Fig. 4, and the instrument is then arranged substantially as indicated in Fig. 5, and the tracing-point moved continuously from any given point wholly over the lines of the diagram, the mean height of the latter will be indicated in length-units by the wheel and vernier, which are graduated to indicate inches and thousandths of an inch. With the use of this instrument no calculations are requisite for obtaining the mean height of diagrams, and if carefully manipulated its results are absolutely reliable. It frequently occurs that many diagrams of various tests of the same pump or engine are to be measured, in which case one adjustment serves for all of them. It is not absolutely essential that said gage-points be in the precise form shown, or that they be located on the side of the instrument, as shown, although most convenient if so arranged, and it is not absolutely requisite that two gage-points be specially provided—as, for instance, one special point can be located on the frame C exactly in line with the fulcrum $d$, in which case the tracing-point $c$ can serve therewith as a gage-point in addition to its usual function; nor is it absolutely essential that said gage-points be extended from the frame and bar, it being obvious that if V-shaped recesses be employed in lieu thereof the adjustment described could be effected, although not so readily as with the projecting gage-points.

Polar planimeters have heretofore been used for measuring the areas of diagrams in square inches, and having so far determined as to a diagram, the sum of said area must be divided by the length of the diagram; but, as before stated, our measuring-wheel and vernier are graduated in length-units, and the instrument is so organized that instead of indicating area it directly indicates the mean height of the diagram when accurately adjusted thereto, as described.

There is another variety of mean-height measurer, which widely differs from ours in that it embodies a measuring-wheel located between the tracer-point and fulcrum-point, this latter being limited to a straight-line movement coincident with one of the end lines of the diagram, and after the wheel has measured area, as a result of tracing the outline of the diagram, the tracing-point is then moved in a straight vertical line at the opposite end of the diagram until the wheel has returned to its initial point, the tracer being then stopped and the diagram-paper punctured, so that the intervening space between said puncture and the base or air line of the diagram may be measured as by a rule for ascertaining the mean height in length-units.

Having thus described our invention, we claim as new and desire to secure by Letters Patent—

1. In an instrument for measuring the mean height of steam-engine-indicator diagrams, the combination, substantially as described, of the fulcrum-bar, the longitudinally-adjustable tracer-bar, the vernier, and the measuring-wheel graduated to indicate its peripheral measurement in linear inches and fractions of an inch.

2. An instrument for measuring the mean height of indicator-diagrams, embodying a measuring-wheel and vernier graduated in inches and fractions thereof, a longitudinally-adjustable tracer-bar, and a fulcrum-bar, and provided with gage-points $ff$, substantially as described, and for the purpose specified.

ERNEST KIMMEL.
EDWARD E. CLAUSSEN.

Witnesses:
CHARLES A. SMITH,
OSCAR I. HAMMAR.